United States Patent [19]

Šandera et al.

[11] 4,048,406
[45] Sept. 13, 1977

[54] ELECTRODE FOR A RECHARGEABLE ELECTROCHEMICAL CURRENT SOURCE, AND METHOD OF MAKING SAME

[75] Inventors: Josef Šandera; Milan Calábek; Miroslav Cenek, all of Brno; Frantisek Kaláb; Vojtěch Koudelka, both of Mlada Boleslav; Oldřich Kouril, Brno; Jiri Malik, Mlada Boleslav; Josef Vaňáček, Brno-Slapanice, all of Czechoslovakia

[73] Assignee: Prazska akumulatorka, narodni podnik, Mlada Boleslav, Czechoslovakia

[21] Appl. No.: 579,481

[22] Filed: May 21, 1975

[51] Int. Cl.² ........................ H01M 4/02; H01M 4/04
[52] U.S. Cl. .................................... 429/209; 429/217; 429/237; 429/246
[58] Field of Search .................... 136/30-31, 136/120 R, 125-127, 95, 102, 19, 20, 75, 68, 63, 147, 148; 429/209, 217, 234, 235, 246; 75/201, 211; 29/182.5

[56] References Cited

U.S. PATENT DOCUMENTS

| 723,326 | 3/1903 | Sperry | 136/63 |
| 2,647,157 | 7/1953 | Booth | 136/147 |
| 2,987,567 | 6/1961 | Freas et al. | 136/30 X |
| 3,592,693 | 7/1971 | Rosansky | 136/30 X |

Primary Examiner—Anthony Skapars

[57] ABSTRACT

Electrode for a rechargeable electrochemical current source and a method of making the same, said current source employing an electrolyte, the electrode having an electrically conductive collector and a mixture of an active mass in a plastic material distributed over the collector and sintered thereon to form an integral element. The electrode has a porous layer of material covering at least a substantial portion of its active surface, the porous layer being made of an electrically non-conductive material which is chemically inert with respect to the electrolyte, the plastic material being bonded to the porous layer by being sintered thereto.

7 Claims, 1 Drawing Figure

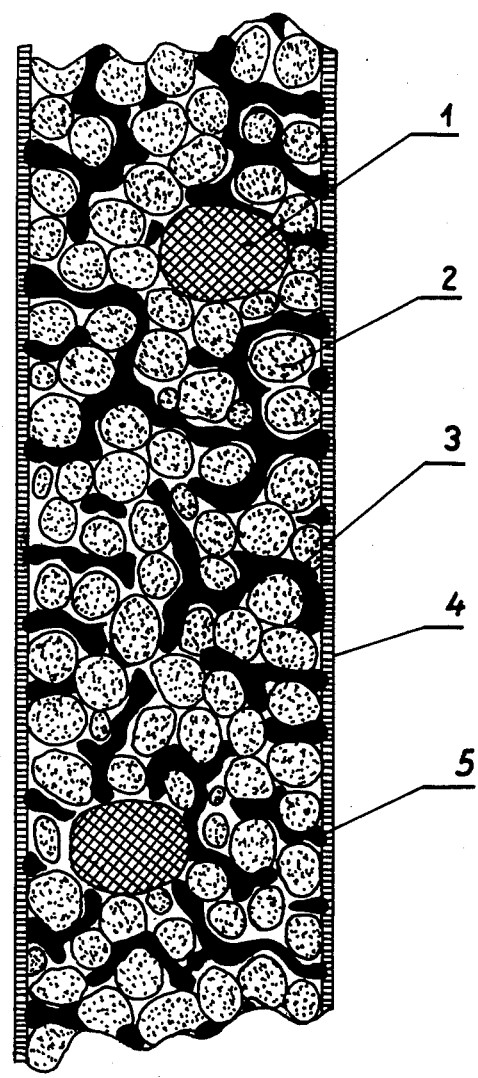

ELECTRODE FOR A RECHARGEABLE ELECTROCHEMICAL CURRENT SOURCE, AND METHOD OF MAKING SAME

This invention relates to a rechargeable electrode for an electrochemical current source such as a storage battery, and a method for making the same, the electrode having an enhanced service life, and the components of the electrode being bonded together so that the electrode can withstand very appreciable mechanical shocks during its operation.

During the operation of electrochemical sources of current, particularly rechargeable lead batteries, there can occur a washing-out of the active masses of the electrodes, so that their electrical characteristics gradually deteriorate. This phenomenon becomes evident especially in the electrodes of a rechargeable storage battery wherein there occur changes of volume of the active masses during the charging and discharging of the battery. Such repeated changes of volume of the active mass during the operation cycles of the battery may cause a loss of coherence of the active mass to the collector, and to the successive washing-out of the active masses from the electrode. These phenomena accelerate the leakage of gases from the pores of the electrodes during their over-charging. These processes are especially evident at the positive plates of a lead battery, and are the main causes of the limited service life of such lead batteries.

In a co-assigned application by the same inventors, entitled "Method of Manufacture of Battery Plates", Ser. No. 570,169, filed Apr. 21, 1975, now abandoned, (designated S 8502, based upon Czechoslovak patent application PV 7801-72, filed Aug. 8, 1972), there is disclosed and claimed the manufacture of battery electrodes using a plastic insert that forms a mechanically solid skeleton in the pores of which there is deposited the active mass. In such application it is disclosed that the washing out of the active mass is limited and that as a result there is achieved a longer service life of the electrode. Nevertheless, the undesired washing-out of the active mass from the surface of the electrode is not fully prevented during faster rates of charging of the battery. Upon the loss of some of the active mass from the electrode, the content of plastic material in the electrode rises with respect to the content of the active mass thereof, thereby not only decreasing the volume of the electrode by the amount of active mass which has been lost therefrom, but also lowering the performance and capacity of the electrode.

A further disadvantage of previously known electrodes is the danger of leakages starting on the peripheral part of the electrode, thereby decreasing the service life of the electrical current source or battery.

The above-described disadvantages of prior art electrodes are overcome by the electrode of the present invention. In accordance with the invention, there is provided an electrode for an electrochemical current source, such as a battery, which has an electrically conducting collector, a mixture of an active mass and a plastic distributed over the collector, and a porous layer of an electrically non-conductive material that is chemically inert with respect to the electrolyte covering a part of or the entire surface of the electrode. Such porous layer may be, for example, a textile material. The mixture of the active mass and of the plastic material is sintered upon the collector, and is bonded to the porous layer by being sintered thereto.

The improved electrode of the present invention is characterized by a minimum amount of washing-out of the active mass during the operation of the electrochemical current source, thereby very considerably limiting the origin of undesired electrical leakages between the electrodes of opposite polarity of such electrochemical current source. Such electrical current source provided with electrodes in accordance with the invention displays a substantial increase in reliability. It has a longer trouble-free life, and permits multiple overchargings without substantial deterioration of its electrical characteristics.

The sole FIGURE of the accompanying drawing is a fragmentary, somewhat schematic view in section through a preferred embodiment of electrode in accordance with the invention.

The electrode shown has an electrically conducting collector grid 1 which is filled with a mixture consisting of particles of an active mass 2 and a skeleton 3 made of plastic material, the skeleton surrounding and reinforcing the particles of the active mass and binding them to the collector 1. The thus-formed electrode is surrounded by a porous textile layer 4 that consists, for example, of a textile made of glass fiber. The porous layer 4 is connected to the skeleton 3 of plastic material at points 5 where the skeleton 3 penetrates into and is bonded to the porous layer 4.

The electrode according to the invention may be made in a number of ways. In a first method of manufacture of the electrode, a mixture of finely-divided particles of the active mass 2 and of the plastic material which is to form the skeleton 3 is placed upon and in the interstices in the collector 1, the resulting collector structure being subjected to elevated temperature whereby to form an integral element made up of the collector 1, the particles of active mass 2, and the skeleton 3 made up of plastic material, such components being bonded together by the sintering of the mixture. The resulting electrode is then coated either partly or wholly by a porous textile layer, the thus-coated electrode being then heated anew under conditions which result in the at least partial penetration of the plastic skeleton 3 into the porous layer 4 at points 5 so as to bond the porous layer 4 upon the electrode. Such second heating cycle may be accompanied by the application of pressure to the electrode applied to the outer surfaces of the porous layer 4.

A second, and perhaps more advantageous method of making the electrode of the invention includes the initial assembly of all the elements 1-5, inclusive, in the manner shown in the drawing. The electrode is then placed in a mold, such as that disclosed in applicants' co-assigned U.S. patent application above-referred to, the mold being closed and the mold with the enclosed electrode being subjected to a single heat cycle whereby to bond the elements together by sintering.

It is to be understood that the above-described two methods of manufacturing the electrode of the invention are illustrative only, since obviously further combinations of the manufacturing steps are possible in order to attain the desired product. An important condition in any of such methods of manufacturing of the electrode is that such method results in an electrode in which there is a perfect connection between the porous textile layer 4, the particles of active mass 2, the skeleton 3 made up of plastic material, and the collector grid 1 so that there is created a uniform, compact, and mechanically solid unit.

According to the needs and demands of the industry the periphery of the electrode may be provided with the porous textile covering layer 4 over only a part of its outer surface, or over its entire outer surface. The porous textile layer 4 creates an electrically insulating frame that prevents the leakage or escape of the active mass from the electrode. Optimum results are achieved, however, when the electrode has its entire external surface covered with a porous textile layer 4. Layer 4 may, for example, be woven of fibers such as glass fibers, polyethylene-terephthalate, or other fiber material that fills the above-set-forth service life conditions including the mechanical, electrical, and chemical conditions which such layer 4 encounters.

The following is an example of the manufacture of positive electrodes for lead batteries adapted for use on vehicles. The electrodes are manufactured by making a mixture of finely-divided active mass and finely-divided polyethylene and applying such mixture to a collector grid in the manner shown in the drawing. A porous textile layer made of woven glass fiber is placed around the electrode so as to cover its surface. The assembly is then sintered at an elevated temperature under uniform pressure.

During service life tests on electrodes made in the manner described immediately above, practically no washing-out of the active mass from the electrodes was detected. In an alternative procedure, the porous layer employed was a non-woven layer made of polyethylene-terephthalate.

Electrodes made in accordance with the invention are especially advantageous in lead batteries. However, the invention may be employed to advantage with suitable changes of the composition of the active mass when they are used in other batteries, as for instance, in alkaline batteries.

Although the invention is illustrated and described with reference to a plurality of prefered embodiments thereof, it is to be expressly understood that it is in no way limited to the disclosure of such a plurality of embodiments, but is capable of numerous modifications within the scope of the appended claims.

What is claimed is:

1. In an electrode for a rechargeable storage battery employing an electrolyte, the electrode having a current collector and a mixture of an active mass and a plastic material distributed over the current collector and sintered thereon to form a skeleton of plastic in the body of said electrode, the improvement which comprises a porous layer of material covering at least a substantial part of the active surface of the electrode, the porous layer being made of an electrically non-conductive material which is chemically inert with respect to the electrolyte and which is bonded to the skeleton of plastic material.

2. An electrode according to claim 1, wherein the plastic material is bonded to the porous layer by being sintered thereto to form an integral element therewith.

3. An electrode according to claim 2, wherein the porous layer covers all of the active surface of the electrode.

4. An electrode according to claim 1, wherein the porous layer is made of woven glass fibers.

5. In a method of making an electrode for a rechargeable storage battery employing an electrolyte, the electrode having a current collector and a mixture of an active mass and a plastic material distributed over the collector and sintered thereon to form an integral element therewith, the improved method which comprises placing a porous layer of material on the electrode to cover at least a substantial part of the active surface of the electrode, the porous layer being made of an electrically non-conductive material which is chemically inert with respect to the electrolyte, and bonding the plastic material to the porous layer by sintering it thereto.

6. A method according to claim 5, wherein the sintering of the mixture of the active mass and the plastic material and the bonding of the plastic material to the porous layer by sintering it thereto take place simultaneously.

7. A method according to claim 5, wherein the sintering of the mixture of the active mass and the plastic material takes place as a first sintering step, and the bonding of the plastic material to the porous layer by sintering it thereto takes place as a second, distinct sintering step.

* * * * *